3,553,125
Patented Jan. 5, 1971

3,553,125
SEALANT COMPOSITION COMPRISING A MIXTURE OF A CROSS-LINKING ELASTOMER AND A GELLED OIL
Alan Watters, Waterlooville, England, assignor to Ralli Bondite Limited, Waterlooville, England, a British company
No Drawing. Filed Aug. 23, 1966, Ser. No. 574,317
Claims priority, application Great Britain, Aug. 26, 1965, 36,632/66
Int. Cl. C08c 11/22; C08d 9/00
U.S. Cl. 260—23.7      18 Claims

ABSTRACT OF THE DISCLOSURE

A two-part sealing composition; one part comprising 100 parts of cross-linking elastomer, 50–200 parts of an oil incorporated therein in the form of a gel, 300–3,000 parts of inert filler, 2–8 parts of anti-oxidant, and 0.5–30 parts of a curative system for said elastomer; the second part comprising 100 parts of cross-linking elastomer, 50–200 parts of an oil incorporated therein in the form of a gel, 300–3,000 parts of inert filler, 2–8 parts of anti-oxidant, and 1.5–30 parts of a room temperature accelerator. The sealing composition may be admixed prior to use. The invention also includes a method of compounding oil with an elastomer comprising providing the oil in the form of a gel and then compounding said gel with said elastomer.

---

The present invention relates primarily to sealant compositions, and in general to compounding oil with an elastomer. The invention relates more particularly (i) to an elastomer/oil composition (ii) to a sealant composition containing oil such that the sealant is of such a viscosity that it may be extruded from a caulking gun and so that the resulting sealant is free from slump (iii) to a sealant composition containing oil, more especially as a two-part sealant, each part of which is stable and can be stored, but which parts, when mixed, cure at room temperature, and (iv) to a method of applying a sealant composition which involves mixing the above-mentioned two parts either on, or just before, applying the sealant to a desired location.

In a first aspect, this invention consists in a method of compounding oil with an elastomer, comprising the steps of forming the oil into a gel and then compounding the oil with the elastomer, and also consists in an elastomer/oil composition formed by this method.

It is strongly preferred that the oil be a naphthenic or paraffinic mineral oil, or mixture of the two, low in or free from aromatic components. Naphthenic oils are generally taken to be those oils containing about 55% of naphthene components to about 45% of paraffin components, or, to give a range, from 50:50 to 60:40 respectively. In paraffinic oils these proportions are reversed, i.e. they lie within the range 40:60 to 50:50, and preferably about 45:55. In any event, though depending on the nature of the elastomer, mixtures should be used which are low in aromatic components.

We have found such gels, as will be described in more detail below, to be especially suitable for softening a rubber-based sealant composition, giving on the one hand a composition different from those to which rubber technologists are accustomed (containing as it does higher proportions of filler than anything used in conventional rubber technology) and on the other hand a sealant composition of more or less the usual consistency met with hitherto but of an elastomeric nature and prossessing the ability to cure to a hard waterproof seal at room temperature.

When the gel is based on a predominantly naphthenic oil it is especially useful for softening compositions where natural rubber or styrene/butadiene rubber is incorporated; when, on the other hand the gel is based on a predominantly paraffinic oil it is a preferred softener for compositions where the type of "rubber" (or elastomer) used is based on a terpolymer of ethylene propylene and a further component giving a potential cross-linking site.

Two solid components stand out as especially useful in forming the gel.

One of the two is bentonite clay, and more especially the aminated bentonite clay known under the trade name "Bentone" and available in various grades. With this material, from 2½ to 10 parts per 100 parts by weight of oil may be used, and preferably about 5 parts. To make up such a gel, "Bentone" or bentonite clay is preferably wetted with a compatible organic liquid (e.g. acetone), mixed with the oil, heated to 60° C.–80° C. with vigorous stirring and then subjected to shear, in, for instance, a colloid mill. This procedure, while giving a very stable gel, is somewhat complicated and uses expensive raw materials.

The other of the two raw materials is aluminium stearate, which merely upon mixing into the oil vigorous stirring and somewhat more heating, e.g. 80° C.–100° C., gives a gel which is stable enough to use for its intended purpose outlined below. From 5 to 25 parts by weight (preferably 10 parts by weight) may be used per 100 parts of oil.

A further aspect of the invention can best be appreciated by studying the compositions below. Briefly, it consists in a sealant composition based on a curable elastomer, a filler, and the gel outlined above, together with other components as listed. There are two forms of such a composition, a putty-like form and a paste-like form, and although within the limits of composition outlined below there might appear to be some overlap, the functional distinction should be borne in mind.

The invention, then, further consists in each of two compositions (part A and part B below). For a putty-like composition, the two parts are each based on 100 parts by weight of a cross-linking elastomeric compound.

| | Part A | Part B |
|---|---|---|
| 1. Cross-linking elastomer | 100 | 100 |
| 2. Inert filler | 300–3,000 | 300–3,000 |
| 3. Antioxidant | 2–8 | 2–8 |
| 4. Oil in the form of a gel | 50–200 | 50–200 |
| 5. Curative system | 0.5–30 | None |
| 6. Room temperature accelerator | None | 1.5–30 |

The above components are essential features of the two compositions. Preferred optional features are:

| | Part A | Part B |
|---|---|---|
| 7. Wax | 2–20 | 2–20 |
| 8. Drying or semi-drying oil | | 50–75 |
| 9. Activator | 0.5–5 | None |
| 10. Pigment | q.s. | q.s. |

To discuss each component in turn:

(1) The cross-linking elastomer may be natural rubber, styrene-butadiene rubber (including the oil-extended form), polybutadiene rubber, (including the oil-extended form), butyl rubber (a copolymer of 85–99.5% of an isoolefin of 4–8 carbon atoms and 0.5–15% of a multiolefin of 4–15 carbon atoms), polychloroprene, polyisoprene, butadiene/acrylonitrile rubber or the ethylene/propylene/cross-linking unit terpolymers (including the oil-extended form). It is preferred to use natural or synthetic rubber with a Mooney viscosity of less than 50 (e.g. of 20–30) but with sufficiently strong equipment to break down the rubber there is no reason why rubber up to a Mooney viscosity of 90 could not be used. A small proportion of non-curable elastomeric polymer may be added to the corss-linking elastomer (bearing in mind the limits set out above) to improve the ozone resistance of the eventual composition.

(2) The filler may be any inert filler although round-particle as distinct from fibrous fillers are preferred or else the viscosity may become too high. Thus, the various particulate silicas, coaldust, carbonblack, clays, or carbonates may all be used. Although from 300–3000 parts of filler may be used per 100 of cross-linking elastomer, the lower limit is generally only suitable for the synthetic rubbers available as compositions of much less than 100% rubber and of low (ca. 25) Mooney viscosity. It is much preferred for there to be from 1000 to 2000 parts of filler in the composition.

(3) The antioxidant may be any conventional antioxidant as known in the rubber industry, either of the staining or non-staining type.

(4) The softener gel has been described in some detail above; it will be obviously used in greater amounts with harder elastomers, other things being equal, to produce a composition of an equivalent degree of softness.

(5) The curative system is almost always a ZnO/sulphur system in which from two to three times as much zinc oxide as sulphur is present. Dicumyl peroxide, although hazardous and unpleasant to use, is a possible curvature in special circumstances, and lead peroxide and triethanolamine may be used.

(6) Room temperature accelerators are available commercially for certain specialized applications (jointing cements, rubber-proofing coatings, usually solvent-based) and the selection of a suitable accelerator will present no problem having regard to the actual cross-linking elastomer chosen. Possible accelerators are para-quinonedioxime, activated dithiocarbamate, zinc dibutyl dithiocarbamate or zinc isopropyl zanthate. Preferably, 10–20 parts by weight of the accelerator are present.

(7) An optional feature with certain advantages is to add from 2 to 20 parts of a micro-crystalline wax or a paraffin wax together with the antioxidant.

(8) A relatively small proportion of a drying or semi-drying oil, such as linseed oil or soya bean oil, may be added to act as an additional plasticiser.

(9) The activator, e.g. stearic acid, is almost always present but may be omitted.

(10) The pigment may be water-based or based on organic solvnt, and be itself organic or inorganic in nature.

For a paste-like composition, the two parts, each being based on 1000 parts by weight of the putty composition above are:

|  | Part A | Part B |
| --- | --- | --- |
| 11. Putty-like composition | 1,000 | 1,000 |
| 12. Softener gel as above | 50–500 | 50–500 |
| 13. Fibrous filler | 5–50 | 5–50 |
| While optional components are: |  |  |
| 14. Resin | 5–100 | 5–100 |
| 15. Drying or semi-drying oil |  | 10–20 |

To consider each of these components in turn:

(11) The putty-like composition has been discussed above.

(12) The softener gel has also been discussed. It should again be noted that naphthenic oil gells are best for natural and SBR rubber while paraffinic oil gels are best for ethylene/propylene/cross-linking unit terpolymers.

(13) The fibrous filler is usually asbestos although glass fibre may be used. It alters the flow characteristics of what would otherwise be an unduly soft composition with a tendency to slump from vertical joints.

(14) The resin may be any commercially available resin, such as hydrogenated resin. It adds adhesivity to the paste-like composition.

(15) The drying oil or semi-drying oil may be, e.g. linseed oil or soya bean oil, but only plays an auxiliary function compared to the function of linseed oil in conventional putty.

It should be borne in mind that the invention resides in part A (in its putty and paste forms) and in part B (in its putty and paste forms). When parts A and B are mixed they can be applied as a putty or a paste but thereafter cure at room temperature to a resistant seal, usually taking between one and seven days for this. However, parts A and B can constitute separate although cognate, articles of commerce, notwithstanding the fact that they will usually be sold in matched quantities in a single package, though in separate containers.

One such package is a two-part cartridge having a core of one part, say A, and an outer layer of B or vice versa. This can be forced through a mixing head on an applicator so that, as applied, it is a mixture.

Alternatively, the two parts may be sold in a joint package and mixed or kneaded by hand in the quantity desired prior to use.

The parts A and B, when mixed, may be used for sealing glass into window panes, sealing around window and door frames or sealing concrete expansion joints. They also are suitable for marine use, in deck-caulking etc., or for sealing road joints. In general they adhere to wood, glass, plastics or metals.

One important distinction of the persent proposals from prior practice is that, hitherto, room-temperature accelerators have only been used on solvent-based rubber cements, etc. Although these have been designed in two parts and mixed prior to use, they are usually liquids (or are dissolved in solvents and mixed for use as liquids). There would be a low filler loading, if any, and a high rubber content, together with a resin to promote adhesivity, and also would have had conventional rubber formations. However, sealant compositions properly so called have not hitherto been based on curable elastomers.

The present composition renders such compositions commercially worthwhile by using a room-temperature curing system and a sealant based on a special solvent system.

The normal level of softener is a rubber composition and is usually only 10–25 parts per hundred of rubber, but the present composition uses a softener in the gel form and can accordingly incorporate very large amounts of softener without loss of mineral oil at the surface. Of course, a mineral oil solvent itself may be added in addition to the gel.

The invention will be further described with reference to the following examples of formulations which may be used to give useful sealants.

EXAMPLE 1

|  | Part A | Part B |
| --- | --- | --- |
| High-grade smoked sheet natural rubber | 50 | 50 |
| Polybutadiene | 40 | 40 |
| Stearic acid | 1 |  |
| Nonox EXN (a substituted phenol antioxidant) | 2 | 2 |
| Paraffin wax | 2 | 2 |
| Whiting | 500 | 500 |
| Gel of naphthenic oil | 150 | 150 |
| Titanium dioxide pigment | 10 |  |
| Zinc oxide | 10 |  |
| Sulphur Z.I.X. (zinc isopropylxanthate) | 6 |  |
| DDCN (diethyl ammonium diethyl dithiocarbamate) (conventional room temperature accelerators) |  | 6 |

EXAMPLE 2

|  | Part A | Part B |
| --- | --- | --- |
| Polybutadiene rubber (solid) | 100 | 100 |
| Polybutadiene in xylene solution (54%) | 100 |  |
| Nonox WSL (a substituted phenol antioxidant) | 6 | 6 |
| Stearic acid | 4 |  |
| Whiting | 2,300 | 2,300 |
| Gel of naphthenic oil | 250 |  |
| Titanium dioxide pigment | 40 |  |
| Zinc oxide | 80 |  |
| Sulphur | 24 |  |
| Z.I.X. |  | 15 |
| DDCN |  | 45 |

EXAMPLE 3

Paste viscosity:
Putty-like composition of Part A or Part B of
  Example 1 _____ 1000
  Gel of naphthenic oil _____ 300
  Resin _____ 50
  Asbestos fibres _____ 25

EXAMPLE 4

Mastic formula:
  Rubber _____ 100
  Whiting _____ 4000
  Gel of paraffinic oil _____ 200–350
  Fibroin filler _____ 10–50
  Hydroabiethyl alcohol _____ 10–50
  Petroleum solvent _____ 50–100

EXAMPLE 5

|  | Part A | Part B |
| --- | --- | --- |
| Polybutadiene | 50 | 50 |
| Ethylene propylene | 10 | 10 |
| Whiting | 400 | 400 |
| Gel | 120 | 120 |
| Nonox WSL | 1.5 | 1.5 |
| Stearic acid | 1 |  |
| Zinc oxide | 8 |  |
| Sulphur | 18 |  |
| Wax | 4 | 4 |
| Accelerator (activated dithiocarbamate) |  | 15 |
| Hydroabiethyl alcohol | 4 | 4 |

It will be noted that if a self-curing sealant composition is not required, either part of the composition may be used on its own as a mastic, when no curing will occur. Following from this, it is possible to omit the curative system, accelerator and activator from the compositions in order to produce a mastic, and according to a further aspect, this invention consists in a mastic composition comprising, by weight, 100 parts of cross-linking elastomer, 300–5000 parts of inert filler, optionally 2–8 parts of anti-oxidant, and 50–500 parts of an oil in the form of a gel.

The mastic composition may have any of the features noted above, providing the curative system, accelerator or activator are absent, and the mastic composition may be as specified in any of the examples, with the omission of the curative system, accelerator and activator.

I claim:

1. A method of compounding oil selected from the group consisting of naphthenic and paraffinic mineral oils and mixtures of the same with an elastomer, comprising forming a gel of said oil by mixing a gelling agent therewith and then intimately compounding said gel with said elastomer.

2. A method as claimed in claim 1, wherein said elastomer is a rubber selected from the group consisting of natural rubber and styrene/butadiene rubber, and wherein said oil is a naphthenic oil containing 50 to 60% by weight of naphthene components and 50 to 40% by weight of paraffin components.

3. A method as claimed in claim 1, wherein said oil is a paraffinic oil containing from 40 to 50% of naphthene components and from 60 to 50% of paraffinic components.

4. A method as claimed in claim 1, including the step of forming said gel by mixing 100 parts by weight of said oil with 2.5–10 parts by weight of bentonite clay.

5. A method as claimed in claim 1, and including the step of forming said gel by mixing 100 parts by weight of said oil with 5–25 parts by weight of aluminum stearate.

6. A sealant composition comprising, by weight, 100 parts of cross-linking elastomer, 50–200 parts of an oil selected from the group consisting of naphthenic and paraffinic mineral oils and mixtures of the same incorporated therein in the form of a gel, 300–3,000 parts of inert filler, and 0.5–30 parts of a curative system for said elastomer, said gel comprising a mixture of said oil and a gelling agent.

7. A composition as claimed in claim 6 wherein said elastomer is selected from the group consisting of natural rubber, styrene-butadiene rubber, polybutadiene rubber, a copolymer of 85–99.5% of an isoolefin of 4–8 carbon atoms and 0.5–15% of a multiolefin of 4–15 carbon atoms, polychloroprene, polyisoprene, and butadiene/acrylonitrile rubber.

8. A composition as claimed in claim 6, wherein said filler is a round particle filler.

9. A composition as claimed in claim 6, and including 2–20 parts by weight of wax.

10. A composition as claimed in claim 6, and including 50–200 parts by weight of an at least semi-drying oil.

11. A composition as claimed in claim 6, and including 0.5–5 parts by weight of an activator.

12. A paste-like sealant composition, comprising, by weight, 1000 parts of the composition as claimed in claim 6, 50–500 parts of oil selected from the group consisting of naphthenic and paraffinic mineral oils and mixtures of the same in the form of a gel and 5–50 parts of fibrous filler.

13. A sealant composition comprising, by weight, 100 parts of cross-linking elastomer, 50–200 parts of an oil selected from the group consisting of naphthenic and paraffinic mineral oils and mixtures of the same incorporated therein in the form of a gel, 300–3,000 parts of inert filler, and 1.5–30 parts of a room temperature accelerator, said gel comprising a mixture of said oil and a gelling agent.

14. A sealant composition as claimed in claim 13 wherein said elastomer is selected from the group consisting of natural rubber, styrene-butadiene rubber, polybutadiene rubber, a copolymer of 85–99.5% of an isoolefin of 4–8 carbon atoms and 0.5–15% of a multiolefin of 4–15 carbon atoms, polychloroprene, polyisoprene, and butadiene/acrylonitrile rubber.

15. A composition as claimed in claim 13, wherein said filler is a round particle filler.

16. A composition as claimed in claim 13, and including 2–20 parts by weight of wax.

17. A composition as claimed in claim 13, and including 50–200 parts by weight of an at least semi-drying oil.

18. A paste-like sealant composition, comprising, by weight, 1000 parts of the composition as claimed in claim 13, 50–500 parts of oil selected from the group consisting of naphthenic and paraffinic mineral oils and mixtures of the same in the form of a gel and 5–50 parts of fibrous filler.

References Cited

UNITED STATES PATENTS

| 23,773 | 4/1859 | Mayall | 260—752 |
| 632,022 | 8/1889 | Repin | 260—752 |
| 1,979,943 | 11/1934 | Klemgard | 260—752 |
| 2,282,882 | 5/1942 | Patnode | 260—33.8 |
| 2,919,256 | 12/1959 | Wallgren | 260—33.6 |
| 1,902,635 | 3/1933 | Gebhardt | 252—35 |
| 2,119,280 | 5/1938 | Kronquest et al. | 106—23 |
| 2,993,064 | 7/1961 | Bulloff | 260—414 |
| 3,400,090 | 9/1968 | Maslow | 260—23.7 |
| 3,400,091 | 9/1968 | Stumpe | 260—23.7 |

OTHER REFERENCES

Baker's Polycin 781 for Rubber Shoe Sole Stocks (Technical Bulletin #23), The Baker Castor Oil Company, 1950, pp.: cover, 1, 2.

American Paint Journal, Apr. 6, 1964, pp. 96–115, Joseph W. Prane, Vehicle for Sealants and Calking Compounds.

Kirk-Othmer, "Encyclopedia of Chemical Technology," vol. 3, pp. 355–356, (1964).

DONALD E. CZAJA, Primary Examiner

D. J. BARRACK, Assistant Examiner

U.S. Cl. X.R.

260—27, 28.5, 33.6, 34.2, 41.5, 45.95, 754, 757, 759